United States Patent [19]

Hays

[11] 4,224,558

[45] Sep. 23, 1980

[54] SELECTABLE SERVO RATIO AND DUAL SPEED CONTROL SYSTEM FOR LARGE CENTRIFUGE UNITS

[75] Inventor: Wilbur L. Hays, Alamogordo, N. Mex.

[73] Assignee: The United States of America as represented by the Secretary of the Air Force, Washington, D.C.

[21] Appl. No.: 868,354

[22] Filed: Jan. 10, 1978

Related U.S. Application Data

[63] Continuation-in-part of Ser. No. 621,327, Oct. 10, 1975.

[51] Int. Cl.² ............................................. H02P 5/16
[52] U.S. Cl. .................................. 318/314; 318/318; 318/592
[58] Field of Search ............... 318/314, 326, 327, 328, 318/341, 594, 592; 310/168; 307/106

[56] References Cited

U.S. PATENT DOCUMENTS

| 3,207,970 | 9/1965 | Branco | 318/314 |
| 3,895,278 | 7/1975 | Picunko | 318/327 |
| 3,953,774 | 4/1976 | Sato et al. | 318/594 |
| 3,971,995 | 7/1976 | Eielberger | 310/168 UX |

Primary Examiner—David Smith, Jr.
Assistant Examiner—M. Mutter
Attorney, Agent, or Firm—Joseph E. Rusz; William Stepanishen

[57] ABSTRACT

A selectable servo ratio and dual speed centrifuge control apparatus utilizing a plurality of phase-lock loops with selected gain increments to provide motor control from coarse to fine in conjunction with an automatic acceleration and deceleration circuit.

1 Claim, 11 Drawing Figures

SELECTABLE SERVO RATIO AND DUAL SPEED CONTROL SYSTEM FOR LARGE CENTRIFUGE UNITS

STATEMENT OF GOVERNMENT INTEREST

The invention described herein may be manufactured and used by or for the Government for governmental purposes without the payment of any royalty thereon.

CROSS REFERENCE TO RELATED APPLICATION

The present patent application is a continuation-in-part of U.S. patent application No. 621,327, filed Oct. 10, 1975, entitled "Selectable Servo Ratio And Dual Speed Control System For Large Centrifuge Units "by Wilber L. Hays.

BACKGROUND OF THE INVENTION

The present invention relates broadly to a centrifuge control apparatus, and in particular to a variable ratio dual speed control apparatus for large centrifuge units.

In the prior art, large centrifuge units required main drive control systems which utilizes a 3 phase, 120 pole synchronous motor for fine speed control of the centrifuge. The induction motor rotor which was switched as a function of RPM used resistors to limit current and maintain a high torque during acceleration and braking of the 650,000 slug-ft$^2$ inertia load. Because of the wide RPM range requirements of the centrifuge, 5 RPM to 116 RPM, a variable frequency, variable voltage power supply was required to excite the synchronous motor stator. A solid state power supply, using silicon controlled rectifiers (SCR) to synthesize, a 3 phase stepped wave form, provided the drive for the synchronous motor armature.

The operation of this prior art system consisted of selecting the desired RPM (G level) on the frequency synthesizer and manually accelerating the main arm with 550 volts until the synchrascope indicated synchronous speed was reached. The 550 volts to the main arm induction motor was removed and the variable voltage alternator, controlled by the sustainer pot, was used to maintain in near synchronous speed while power was applied to the synchronous motor stator and field. After the synchronous motor was properly excited, the manual phase shifter potentiometer and the sustainer potentiometer was adjusted for proper load division between the two drive motors, at the same time reducing the main arm velocity and position error shown on the synchroscope. Once the velocity and position error were within allowable limits, ±0.0017 radian, position error and ±0.0008 radian/sec, velocity error) the synchronous motor was placed in the "synch mode" by replacing the 720 cycle/rev with the precision frequency. The motor was now free to operate at the load angle required to maintain synchronization, damping being provided through the accelerometer and lag network to stabilize the loop. This prior art system, however, has disadvantages, a few of which are as follows:

1. The power output of the variable frequency power amplifier was limited to 20 KW (rated at 220 KW) due to design problems in the commutator section of the amplifier.

2. The variable frequency power amplifier was very unreliable due to noise sources being coupled into the SCR gates which caused frequent current overloads due to incorrect voltage sequences being generated by the amplifier.

3. The system could not be used for speed control below 15 RPM because of excessive synchronizing time.

4. Above 15 RPM, the system is cumbersome to operate and slow to synchronize with times of 4 to 10 minutes.

SUMMARY

The present invention utilizes a selectable servo ratio, dual speed control system with automatic acceleration and deceleration to drive a centrifuge main arm. Phase-lock loops provide the coarse and fine centrifuge speed control. The fine control represents a low gain input acting in a mode of 720/1 while the coarse control provides greater torque and a higher gain and operate at a mode of 45/1. The auto acceleration/deceleration circuit performs the cut-out and motor transfer. The binary dividers are utilized to divide the phase lock loop frequencies in such a manner that the control servo-ratio is divided by $2^n$, where n is the number of the binary divider stages. Thus, for a four stage divider, the coarse 45/1 servo-ratio applies. Through the selective use of the binary dividers it is possible to use multiple loop control, using the coarse servoloop to damp the velocity error, while integrating the 720/1 loop to zero position error in preparation for fine control.

It is one object of the invention, therefore, to provide an improved centrifuge main arm control apparatus having selectable servo ratio for a dual speed control system.

It is another object of the invention to provide an improved centrifuge main arm control apparatus having an automatic acceleration and deceleration control.

It is yet another object of the invention to provide an improved centrifuge main arm control apparatus utilizing a plurality of phase-lock loops with selective gain control increments.

These and other advantages, features and objects of the invention will become more apparent from the following description taken in connection with the illustrative embodiment in the accompanying drawings.

DESCRIPTION OF THE PREFERRED EMBODIMENT

Figure 1A:
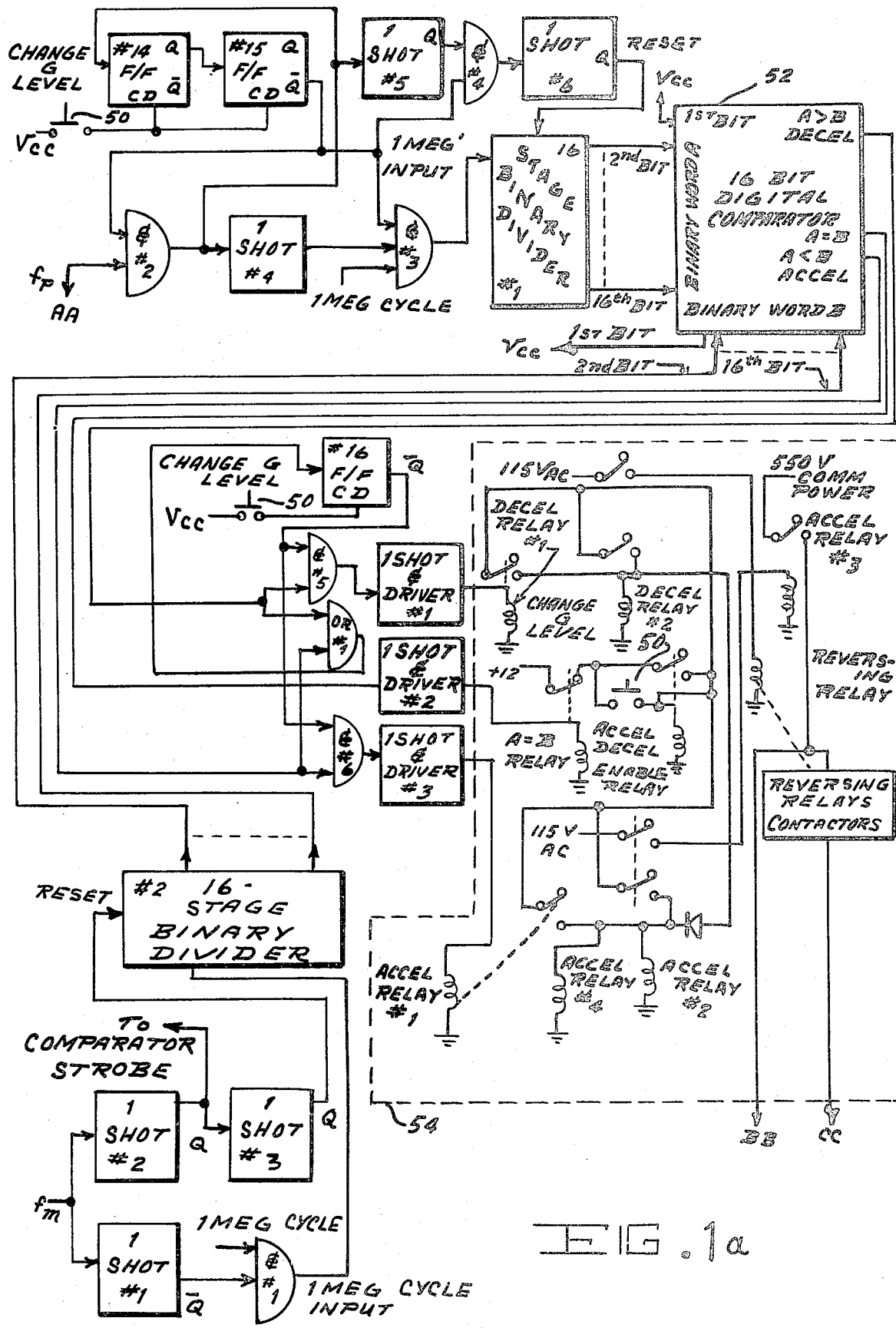
FIG. 1a-c in combination being respectively connected at the points indicated by the respective characters comprise a block diagram of a selectable ratio dual speed centrifuge control apparatus in accordance with the present invention.
Figure 1B:
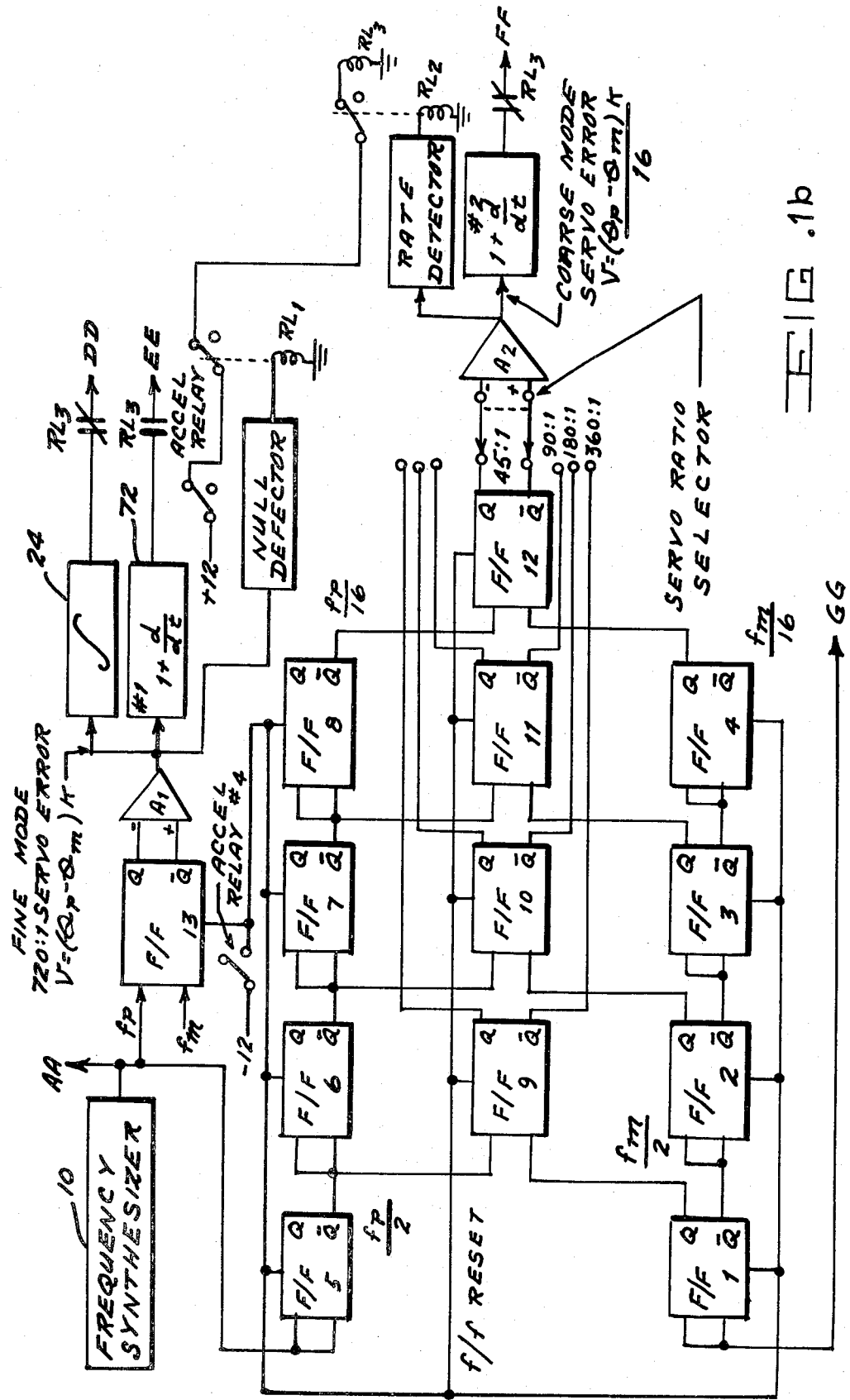
Figure 1C:
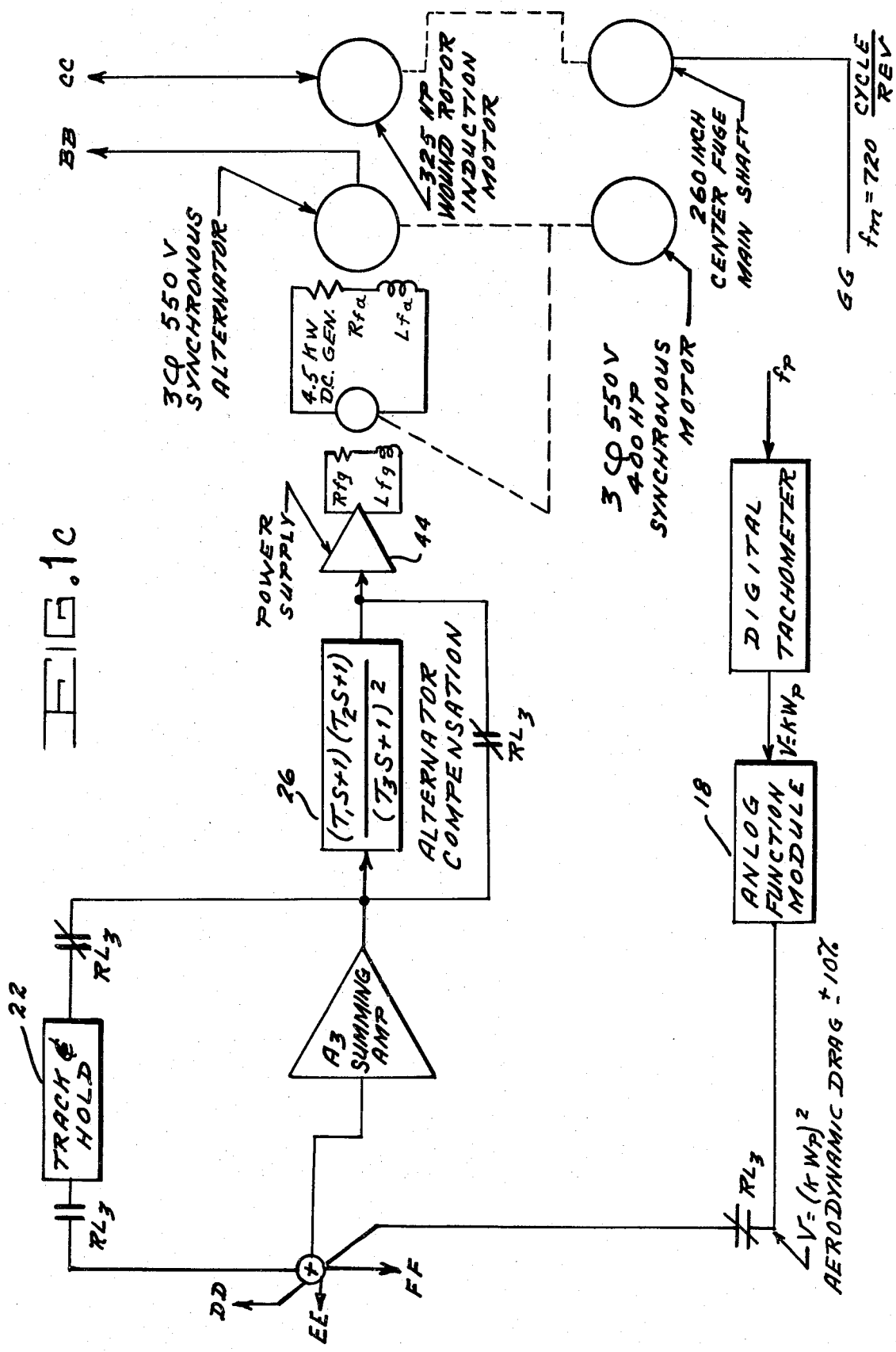

Referring now to FIGS. 1a–c in combination, there is shown a complete block diagram of the selectable servo ratio dual speed centrifuge control apparatus wherein the circuit interconnections of the FIGS. 1a–c are designated by like characters.

The centrifuge main arm control apparatus operates in the following manner: System operation starts with the selection of a desired RPM on the frequency synthesizer 10 of FIG. 1b and depressing the change G level button 50 of FIG. 1a. The precision frequency, $f_p$, is digitized and stored as a binary word A in the digital comparator 52 of FIG. 1a where it is compared with word B, the digitized main arm frequency, $f_m$, when a $f_m$ pulse occurs. The comparator 52 generates the appropriate acceleration or deceleration signal and locks up the power control relays 54 and inhibits any further acceleration or deceleration signals. The acceleration or deceleration signals apply 550 volts to the 3 phase 325 horsepower wound rotor induction motor for accelerating or decelerating the centrefuge main shaft. The output of power supply 44 of FIG. 1c drives the 4.5 Kw generator field which excites the 550 volt synchronous alternator which serves as a variable voltage power supply for the system. The induction motor is activated by 550 volts until the binary word B matches the binary word A within two microseconds at which point the comparator 52 generates an A=B signal, thus dropping out the power control relays 54. At this point, the reset signal from the flip flops of FIG. 1b is removed setting the position error of all coarse mode servo ratio counters to zero±0.25 degrees. The power is now applied to the induction motor from the combined output of the intergrated 720:1 loop, the selected coarse loop and the analog function module 18 to overcome aerodynamic drag and reduce the velocity error to zero. The voltage necessary to accomplish this function is stored in the track and hold circuit 22. When the coarse mode rate error and the 720:1 mode position error are reduced to pre-select limits, relay RL3 is energized thus removing the 720:1 mode integrator 24, the coarse mode proportional plus rate control, the function mode module 18 and energize the 720:1 proportional plus rate servo 72 to control arm velocity with aerodynamic drag being supplied by the track and hold unit 22. The relay RL3 switches the main alternator compensation 26 into the servo loop, thereby improving system control due to the increase in frequency response.

Figure 2:
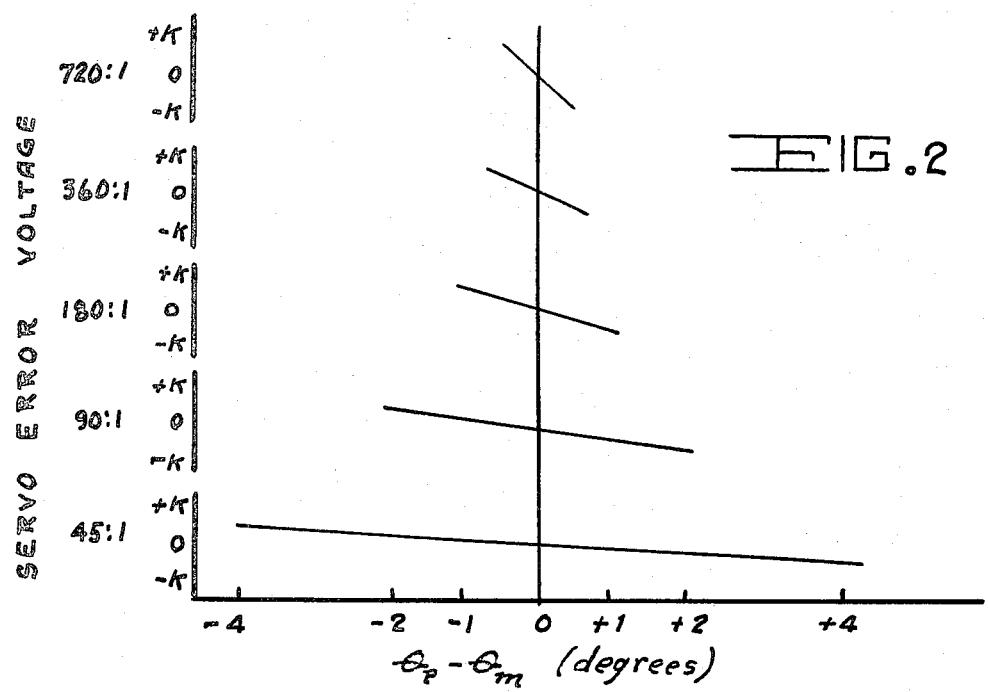
FIG. 2 is a graphical representation of the servo error voltage versus shaft load angle ($\theta_p$-$\theta_m$) at the indicated servo ratios.

The servo control signals which are used in this system are generated by flip-flops 1 through 13 with amplifiers A1 and A2 used for converting the negative flip flop output to a bi-polar voltage and to provide filtering. Each input $F_m$ and $f_p$ is fed to a 4 stage serial binary divider (plus being fed into flip flop 13 for the 720:1 Mode) for frequency division and resultant reduction in servo ratio. The outputs of the binary divider are then fed into flip flops 9 through 12 for comparison and generation of square waves whose switch points are controlled by the divided $f_m$ and $f_p$ pulses. These square waves would generate the voltages shown in FIG. 2, if they were scaled equally, where K could be a maximum of 12 volts. Thus, if $f_m$ was to move ±4 shaft degrees from the zero position, the output at the filter of amplifier A2 could swing ±12 volts while the 720:1 mode would generate ±12 volts for every ±0.25 shaft degrees. The flip flops are reset at the end of the accel or decel phase to set $\theta p - \theta m$ to zero, within ±0.25 degrees, to prevent large position errors from making the coarse loop unstable. This alignment makes possible servo ratio selection as shown in FIGS. 1a–c. This method of servo ratio selection has in fact been used on the centrifuge counterrotating platform servo when oscillatory modes required a wider $\theta p - \theta m$ with less gain with the requirement to return to the higher servo control at the end of the oscillatory mode.

Figure 3:
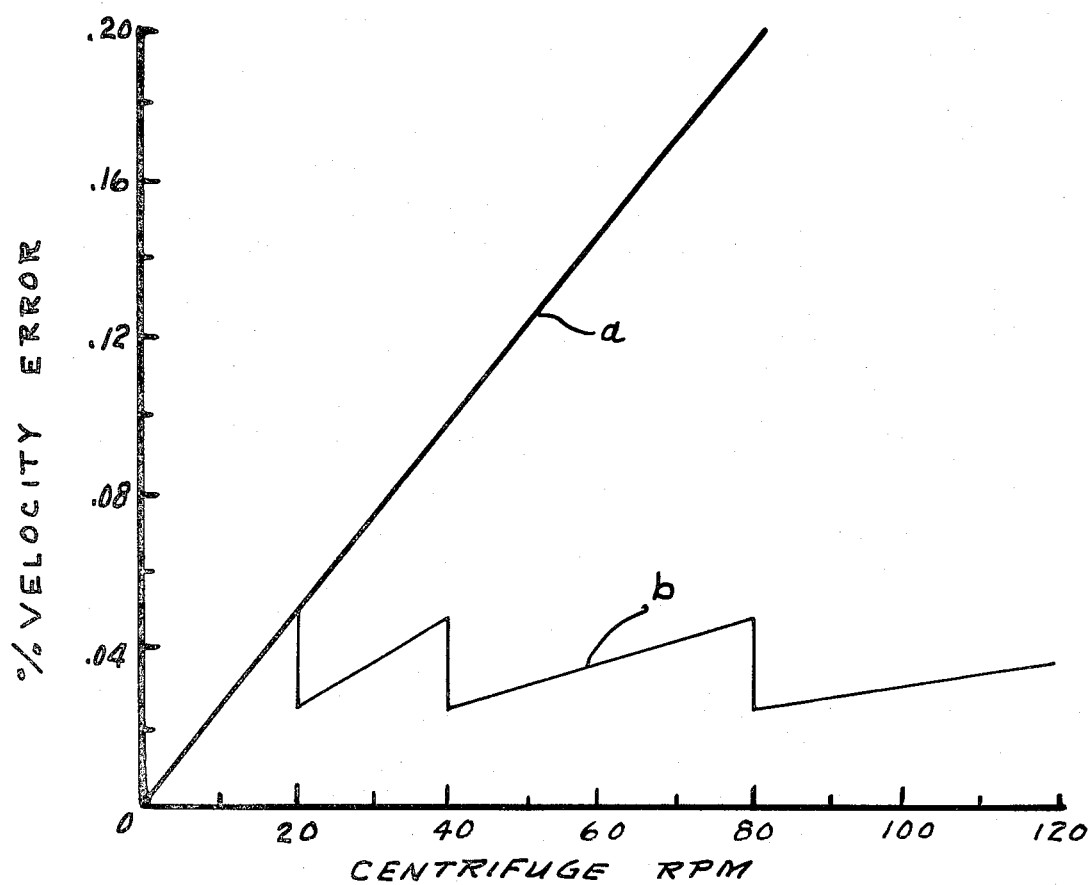
FIG. 3 is a graphical representation of the percent velocity error versus centrifuge RPM.
Figure 4:
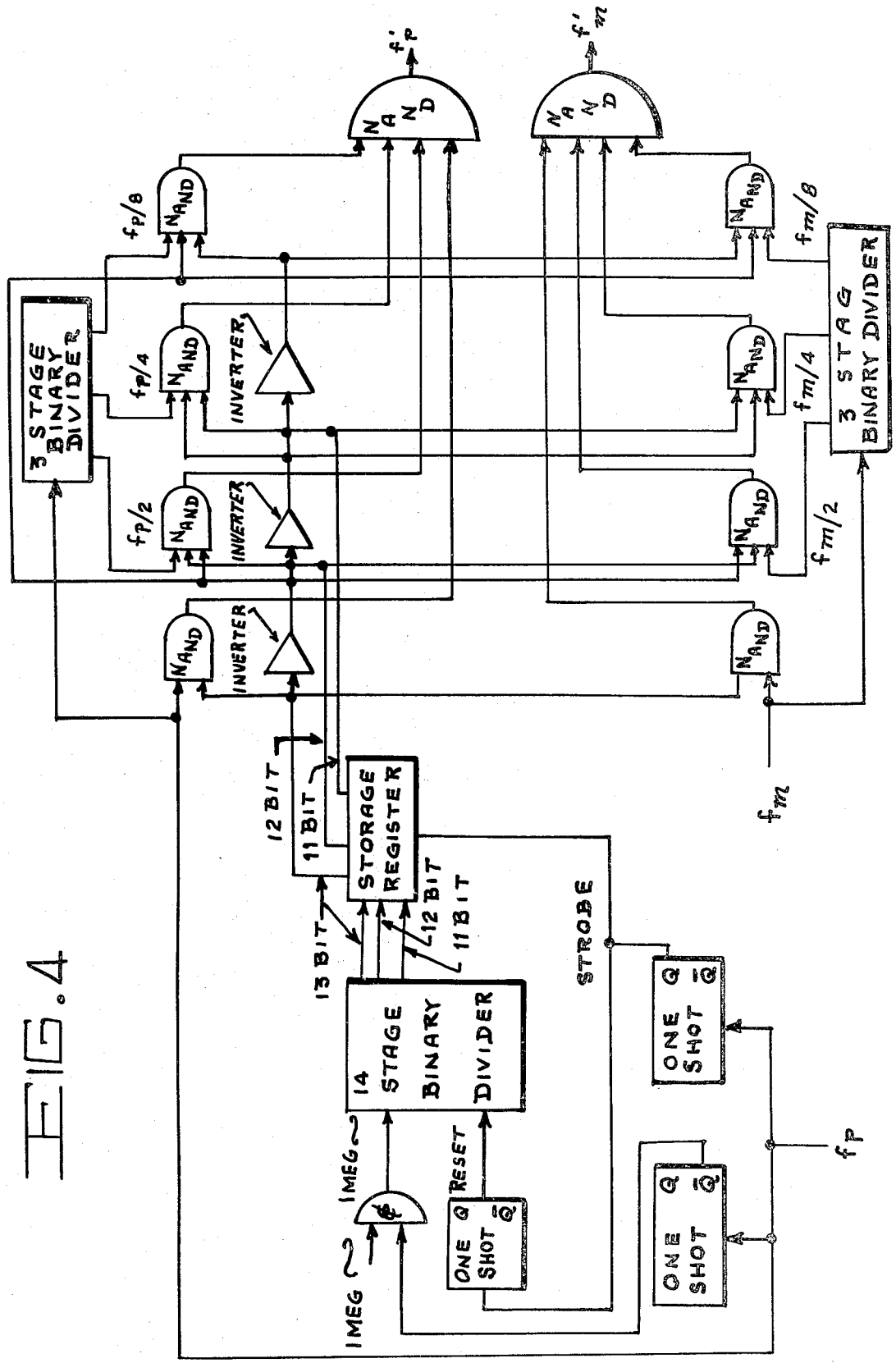
FIG. 4 is a block diagram of the gating circuitry required for increasing the digital comparator sampling period as a function of RPM level.

The centrifuge main arm control system as shown in FIGS. 1a–c has the following undesirable features (1) the system will not control angular velocity within the desired ±10 part per million (2) requires servo gain change with increasing RPM due to the $V^2$ term in the induction motor torque equation (3) velocity error at the end of the accel/decel phase increases with RPM. These problems can be solved in the order they are listed by (1) replacing the alternator compensation circuit with current feedback from the alternator field. This improves frequency response and permits higher loop gain resulting in angular velocity control of ±5 part per million (2) linearize the system with an analog square root module (can be inserted in circuit where former compensation network was) which will permit operation at different RPM levels with a constant gain (3) the problem of increasing velocity error with increasing RPM is due to the two bit uncertainty in the digital comparator and is shown as curve A in FIG. 3. Since this two microsecond uncertainty becomes a larger percent of period of fm at higher speeds, a circuit for keeping the period of fm large is shown in FIG. 4 whereby the frequency $f_m$ and $f_p$ is divided by a function of $f_p$, the commanded RPM. The outputs $f_p$ and $f_m$ of FIG. 4 may be substituted for the $f_p$ and $f_m$ digital comparator inputs in FIG. 1. The circuitry in FIG. 4 operates in the following manner. This logic divides and selects the command RPM frequency fp and main arm frequency fm, as a function of commanded RPM, for use in the 16 bit digital comparator. Fp and Fm is fed to 3 stage binary dividers for division, the output of the dividers then being selected by the storage register output and gating networks. The 11th, 12th and 13th bit outputs from the storage register are derived from fp which is digitized at a 1 meg cycle rate in the 14 stage binary divider. These bits chosen as switch points corresponds to commanded RPM's of approximately 80, 40 and 20 respectfully. Thus $f^1p$ and $f^1m$ are selected, divided frequencies which are then digitized in 16 bit binary dividers and compared in a 16 bit digital comparator (see FIG. 1). Dividing fp amd fm is necessary to limit the velocity error caused by the 2 bit uncertainty of the of the digital comparator, reducing the percent velocity error at the end of the accel/decel phase from that shown in curve a to that shown in curve b in FIG. 3. This improved velocity error permits synchronizing the machine to ±5 part per million in less than 1 minute at all RPM levels.

The following detailed description is a typical operation for speed selection of the centrifuge main shaft, using the present control system, including specific detailed explanations of the various constituent parts of the circuits.

I. Speed Selection and Auto Accel (or Decel)

The desired RPM is selected on the frequency synthesizer (10) and Change G Level is switch (50) is depressed. Depressing switch 50 supplies Vcc (+5 volts)

to the clear direct (CD) input of flip-flops #14, 15 and 16 (setting $\overline{Q}$ positive) and actuates the Accel/Decel enable relay, locking this relay thru the normally closed contacts of the A=B relay. Releasing switch 50 starts the sequence of digitizing and storing the output of 10 as binary word A in the 16 bit digital comparator (52), for comparison with binary word B. Since binary word A must be a constant value for comparison with the varying word B, a maximum of the two cycles of fp is passed through and gate #2, then flip flop #15 flips over, inhibiting and gate #2, #3 and #4. This "freezes" the last count in the #16 stage binary divider until the next G level is selected. Since the 16 bit comparator is strobed by fm (Q output of 1 shot #2) an accel or decel signal could have been generated while fp was being "read" and stored as binary A. To prevent this, the 16 bit comparator strobe is inhibited until binary word A is frozen. The 16 stage binary dividers are driven at 1 megacycle and are stopped, read and reset with each input pulse. For example, divider #2 is driven thru and gate #1 when the Q of one shot #1 is positive. The one shot #1 and #2 are actuated with the leading edge of the fm pulse and one shot #3 is activated when one shot #2 times out. Thus, when fm occurs, the 1 megacycle is inhibited by and gate #1 ($\overline{Q}$ of one shot #1 goes negative) stopping the #2 16 bit binary divider while the digital comparator is strobed with the Q output of one shot #2. When the 1 microsec comparator strobe is ended, one shot #3 is actuated, generating a 1 microsec reset signal for the #2 binary divider. One shot #1 times out in about 2.5 microsec releasing the inhibit on and gate #1, driving the #2 binary divider at 1 megacycle again. The error in binary B, caused when the #2 binary is stopped, and and then reset, is corrected during the reset of this divider since this logic had preset capability. The #1 16 stage binary divider is controlled the same way except only two cycles are "read", the period of the last cycle being stored on the divider for comparison with fm.

The control logic on the output of the digital comparator works as follows: When the first comparison of word A and B is made, the comparator will generate A>B or A<B. Assuming that an accel signal is generated, one shot+driver #3 is actuated, which actuates accel relay #2 which in turn is locked up thru the actuated accel/decel enable relay. The A<B pulse goes thru or #1, flipping flip flop #16, inhibiting any more accel pulses from the comparator. When accel relay #2 is closed, 550 volts is applied thru accel relay #3 to the main induction motor. Acceleration of the centrifuge continues until the period of fm matches the period of fp ($\pm 1$ bit) at which time the comparator generates A=B, picking up the A=B relay and dropping out accel relay #2. This completes the accel phase, leaving any remaining velocity error to be reduced by the control system to $\pm 10$ part per million (PPM) at the selected RPM.

II. Control Phase

The control phase consists of two phases, the transient phase and the fine control phase. Since both phases are controlled by the servo ratio logic it is imperative that this logic be understood before one can understand how centrifuge RPM is controlled by locking centrifuge frequency fm, to the commanded frequency, fp.

A. Servo Ratio Logic

Figure 5:
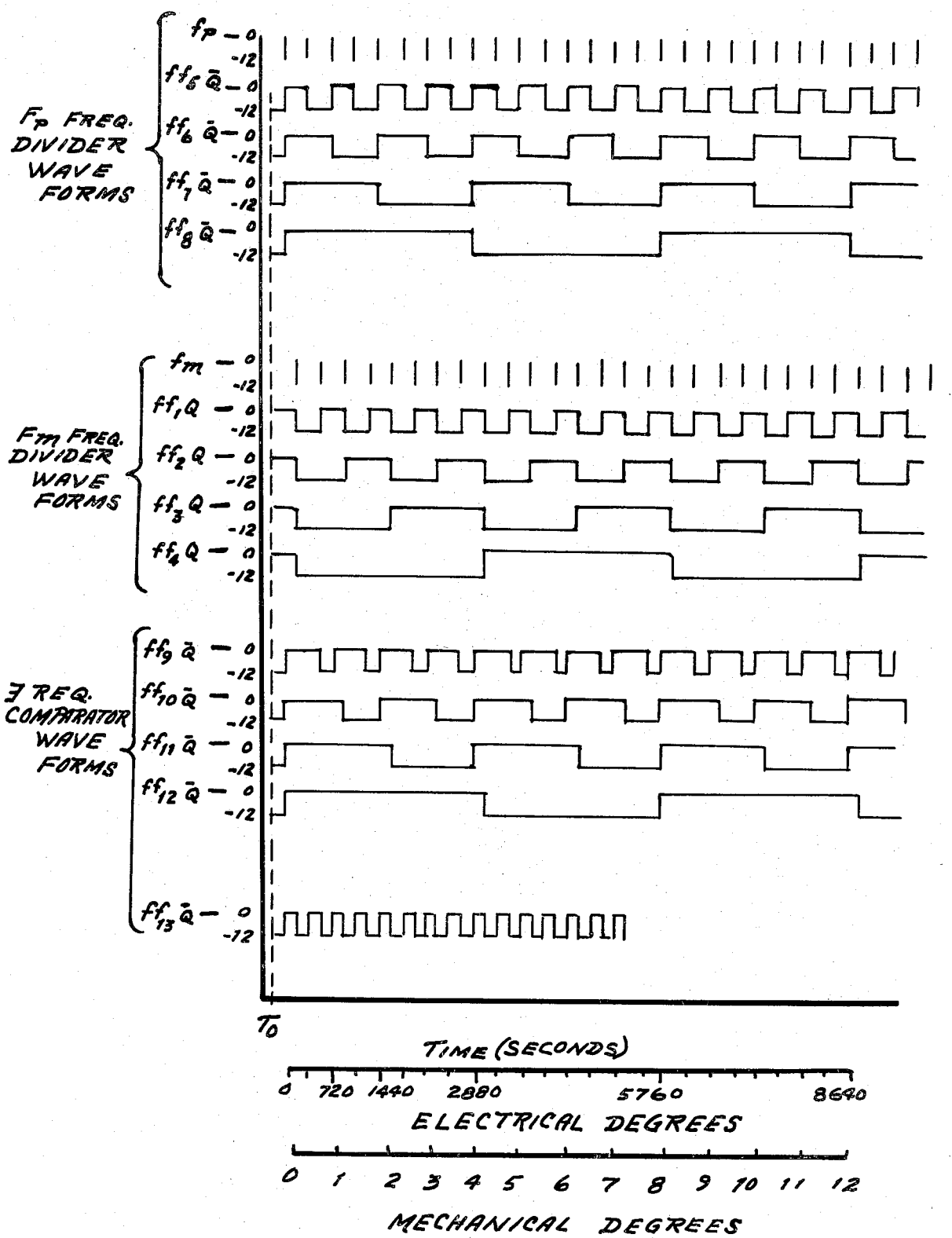
FIG. 5 is a graphical representation of the servo ratio logic waveforms.

This logic is composed of a frequency divider for fm (ff1 thru 4), a frequency divider for fp (ff5 thru 8) and frequency comparators for comparing these divided frequencies (ff9 thru 12). Ff13 is also used as a frequency comparator but uses fm and fp direct. FIG. 5 is a graphical representative of servo ratio logic waveforms to explain how the servo voltage is derived. This graph shows the various waveforms on the vertical axis Vs time, electrical and mechanical degrees on the horizontal axis. The ff's in this logic are standard, $-12$ volt ff's with reset capability and two outputs, one the compliment of the other. If one requires frequency division (ff1 thru 4 and ff5 thru 8) the AC inputs are connected together as shown in FIG. 1. If one requires frequency comparison, which is necessary for phase angle detection, the AC inputs are connected to separate inputs, as are ff9 thru 13. The reset lines are connected to properly sequence the ff's preventing large load angles from being generated at the instant the accel/decel period is ended. Looking at the divider waveforms shows them to be as expected with each stage dividing by 2. The reset voltage (see FIG. 1) is assumed to be removed at time to in FIG. 5 to insure the sequence shown. The switch points of the frequency comparator waveforms are presented to show they are triggered on and off with different frequencies. Inspection of FIG. 5 will show that the phase of the divided fp and fm frequencies which is applied to and switches the comparator and that of the divided fm are out of phase which also makes the square wave. 180 electrical degrees apart in the present example. When the centrifuge is slowing down, the fm pulse would drift to the right (See FIG. 5) and when it had moved 180 more electrical degrees, the effect is seen on the various frequency comparator waveforms. The waveforms of ff9 $\overline{Q}$ (360:1 ratio) would complete its cycles and repeat as a 360:1 signal should. However, the output from ff12 $\overline{Q}$ (45:1 ratio) would also shift to the right but still would have approximately 152 electrical degrees of its cycle remaining before repeating. Thus the name selectable servo ratio, since the ratio of electrical degrees to shaft degrees is selectable, thereby controlling how far the controlled item can move before making the system unstable due to exceeding the servo range.

B. Generation of Servo Error.

Figure 6A:
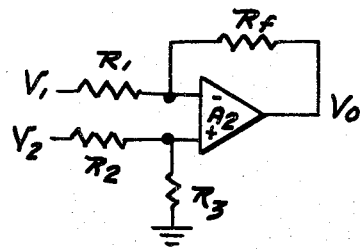
FIG. 6a is a schematic diagram of the differential operational amplifier with its associated circuit relationships.

As shown in FIG. 1 amplifiers A1 and A2 are used to convert the pulse train from the comparators to a D.C. voltage. These amplifiers are standard differential operational amplifiers connected as shown in FIG. 6a with the relationship therein shown.

Figure 6B:
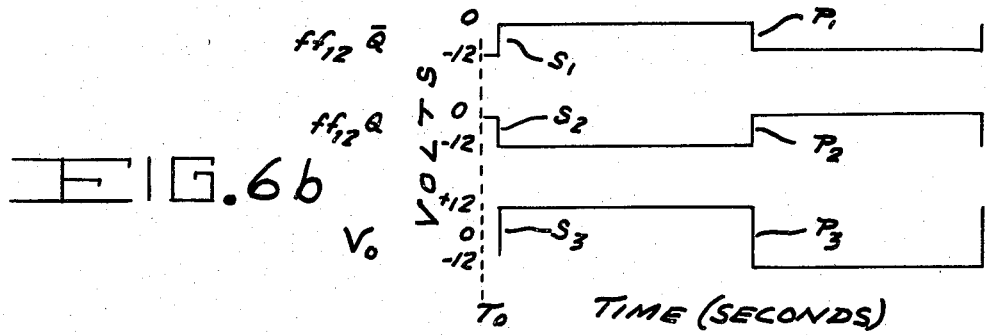
FIG. 6b is a graphical representation of the waveforms associated with differential amplifier A2.
Figure 7:
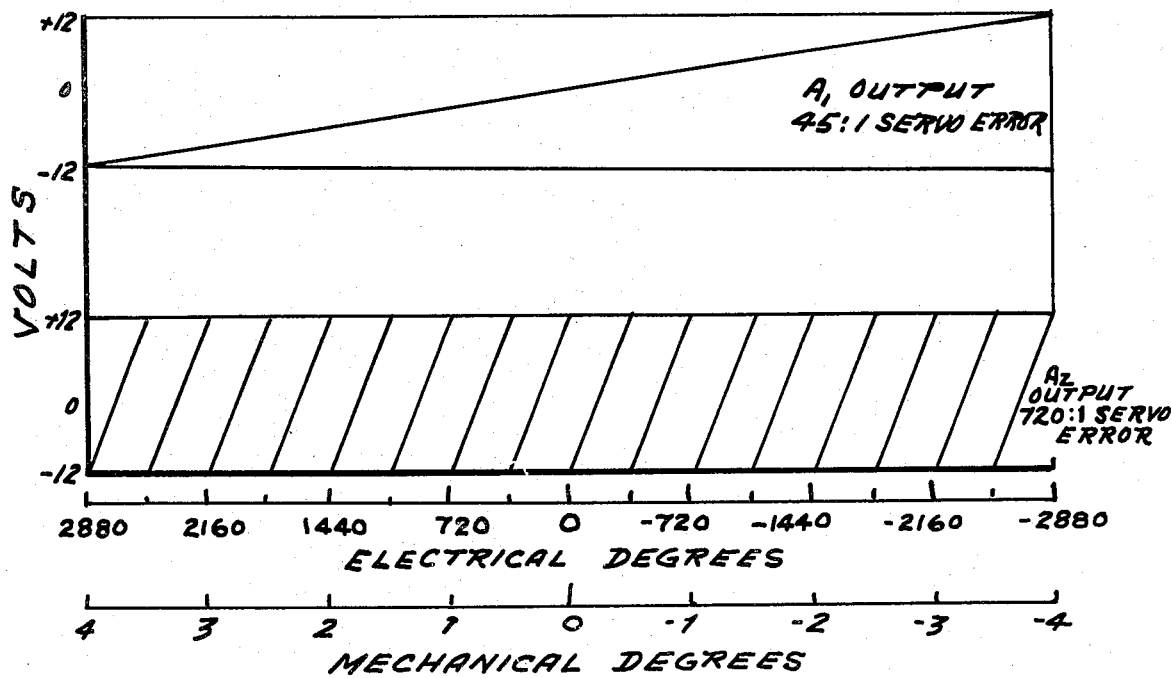
FIG. 7 is a graphical representation of the servo error waveform generated by amplifiers A1 and A2.

In the 45:1 mode, the V2 input is ff12 Q (see FIG. 1) and the V1 input is its compliment. The inputs and A2 output are shown in FIG. 6b. This shows A2 converted the input voltage to a bipolar output and scaled them to $\pm 12$ volts. To get the D.C. control voltage, filtering is added for AC frequency rejection, passing the DC (which is $+1.5$ volts for the wave shown). To see how this generates a servo error in the system, let fm drift to the right (corresponds to shaft slowing down) moving the switch points marked P1, P2 and P3 to the right while the one marked S1, S2 and S3 remains fixed. The servo error generated by A2 and A1 during this speed decrease is plotted in FIG. 7 vs electrical degrees and mechanical shaft degrees. As expected, a mechanical displacement of 8 degrees will cause the 720:1 servo to cycle 8(720)/360=16 times while the 45:1 servo cycles 8(45)/360=1 time, illustrating why the 45:1 servo can absorbe a velocity error 16 times greater than the 720:1 servo.

C. Control During Transient Phase

This control phase is the time between the end of rapid accel/decel and fine control within $\pm 10$ PPm.

Figure 8:
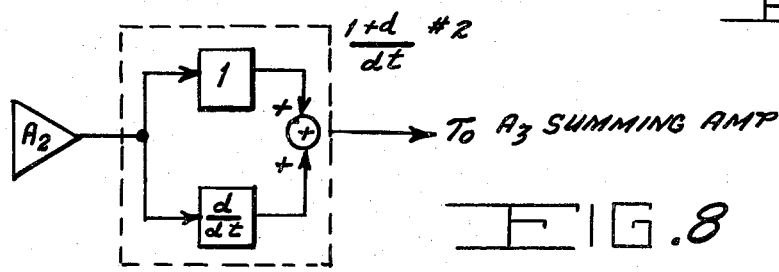
FIG. 8 is a schematic diagram showing the 720:1 proportional plus rate servo in greater detail.

This phase must be quick, simple, reliable and provide automatic switching to the fine control mode if desired. For the following example, assume a negative velocity error at the end of the accel phase which will give a 45:1 servo error increasing in the positive direction. Temporarily remove the integrator (item 24) in FIG. 1 and disable the analog function module (item 18) allowing control solely by the course mode. (A2 output). The servo error (FIG. 7) will increase as the centerfuge fm pulse "backs up" with respect to fp. The A2 output is fed into the #2, 1+(d/dt) circuit which can be broken up to be as shown in FIG. 8. This means the A3 summing amp input is comprised of the shaft position error plus its derivative (the derivative is needed since the huge inertial of the load makes this an undamped system). The coarse mode error will continue to increase until the output of the 3 phase synchronous alternator is large enough for the main induction motor torque to overcome the aero dynamic drag. When the transient has been reduced to a predetermined value the rate detector (on the A2 output) will drop out RL2. The A3 summing amp output is being tracked and stored on the track and hold circuit (22) for later use. The system is now stable but the velocity error is not within the ±10 ppm spec due to low gain and system time constants.

The largest time constant in the system is the 3 phase synchronous alternator field (shown as Rfa and Lfa in FIG. 1). This is approximately 1.5 seconds and must be reduced before system gain can be increased. This is accomplished with load networks in the alternator compensation circuitry (item 26) where in the term $T_2S+1$, $T_2$ is equal to L fa/Rfa. $T_1S+1$ is for a small time constant in the 4.5 KW DC generator field but is insignificant compared to the alternator time constant. The terms in the denominator $(T_3S+1)^2$ is merely a filter to reduce amplification of high frequency noise by the lead networks.

The simplest way to increase gain in the system would be to switch control to the 720:1 mode since besides having a gain 16 times greater than the 45:1 mode, this mode is much easier to filter since the AC components are also 16 times greater. However, one cannot switch to the 720:1 mode since its position output might be large enough to make the servo unstable. To insure that the 720:1 position error is within acceptable limits, the integrator (24) is placed back in the loop and its output is added to the error from the coarse loop. The position of the main shaft is now moved (in relation to fp) until the 720:1 loop drives to one of its nulls, at the same time changing the coarse mode output. When the 720:1 loop is within predetermined limits (as measured by the null detector on A1 output) $R_{L1}$ will drop out. $R_{L3}$ now picks up to switch into the fine control mode.

D. Fine Control

When $R_{L3}$ picks up the coarse loop error is removed and the track and hold (22) output is fed into A3 to supply the voltage to overcome aerodynamic drag. The short circuit across the alternator compensation is removed removing, adding alternator compensation and increasing loop frequency response. RL3 also removed the 720:1 integrator from the loop and switches the #1, 1+d/dt into the A3 summing amp. This is a circuit similar to the one used in the coarse loop, meaning speed control is now being provided by the 720:1 servo error plus its derivative. What we have now is control with a higher gain servo with increased loop frequency response, greatly improving the speed control.

E. Summary of Transient Plus Fine Control.

In actual operation we would have the analog function module in the circuit (temperarily removed in paragraph C) to supply power to overcome aero dynamic drag. This merely eliminated having the servo supply this voltage, a benefit particularly at the higher RPM. For added clarity there is herein presented a typical speed selection problem with all of the circuitry installed. At the end of accel/decel the velocity error can be positive or negative. If positive, the course made servo error goes negative, cutting off and power from being supplied while waiting for aero dynamic drag to slow the arm down. The 720:1 loop is being integrated (item 24) but its time constant is quite large preventing any immediate response from the loop. As the arm slows down, the velocity error goes negative and the position error will swing positive as the main arm "backsup" thru the reference point established when the reset voltage was removed (see FIG. 7). The 720:1 output may go thru several cycles but its output will be limited due to its long time constant. As the coarse mode corrects the velocity error the 720:1 integrator will begin integrating that loop to drive to one of the 720:1 nulls. When the 720:1 null is reached, RL1 drops out and if the velocity error is within limits, $R_{L2}$ drops out. This removes the coarse loop from control, switches in main alternator compensation, removed input voltage to track and hold, switches track and hold output into A3 to supply drag and transfers fine speed control to the 720:1 loop.

Although the invention has been described with reference to a particular embodiment, it will be understood to those skilled in the art that the invention is capable of a variety of alternative embodiments within the spirit and scope of the appended claims.

What is claimed is:

1. In a large centrifuge unit having a variable RPM arm and a main arm frequency signal fm the improvement comprising, a frequency synthesizer generating a precision frequency signal fp adapted to effect a selected centrifuge main arm RPM, digital means for digitizing the precision frequency signal fp and the centrifuge main arm frequency signal fm and for generating an acceleration signal and a deceleration signal in response to relative values thereof, said acceleration and deceleration signals effecting control of the centrifuge main arm RPM, summing means receiving the precision frequency signal fp from said frequency synthesizer and outputting a current control signal, a servo ratio selector circuit connected between said frequency synthesizer and said summing means and generating servo control signals, said servo control signals effecting selected operating mode ratios, a power supply means to drive the centrifuge main arm, said power supply means being current controlled, said power supply means receiving said current control signal from said summing means and providing an output current signal in response thereto, said output current signal driving said centrifuge main arm at a corresponding RPM, a track and hold circuit connected between said summing means and said power supply means, a digital tachometer receiving said precision frequency signal fp, said digital tachometer converting said precision frequency signal fp to a velocity signal, and an analog function module connected to said digital tachometer to receive said velocity signal, said analog function module providing an analog voltage proportioned to said velocity signal, said analog function module being connected to said summing means.

* * * * *